United States Patent
Miyano et al.

(10) Patent No.: US 7,807,269 B2
(45) Date of Patent: Oct. 5, 2010

(54) SILICIDE JOINT AND METHOD FOR MANUFACTURING THE SAME

(75) Inventors: Mari Miyano, Kodaira (JP); Saburo Sano, Nagoya (JP); Akihiro Tsuzuki, Nagoya (JP)

(73) Assignee: Bridgestone Corporation, Tokyo (JP)

( * ) Notice: Subject to any disclaimer, the term of this patent is extended or adjusted under 35 U.S.C. 154(b) by 319 days.

(21) Appl. No.: 12/017,761

(22) Filed: Jan. 22, 2008

(65) Prior Publication Data

US 2008/0176087 A1 Jul. 24, 2008

(30) Foreign Application Priority Data

Jan. 23, 2007 (JP) ............................. 2007-012805

(51) Int. Cl.
*B32B 9/00* (2006.01)
*B32B 38/00* (2006.01)

(52) U.S. Cl. .................... 428/450; 428/698; 156/272.2; 156/273.7; 156/273.9

(58) Field of Classification Search ................. 428/450; 156/60

See application file for complete search history.

(56) References Cited

U.S. PATENT DOCUMENTS 4,624,403 A * 11/1986 Kohno et al. ............. 228/124.1
4,749,118 A * 6/1988 Yokoi et al. ................. 228/208

FOREIGN PATENT DOCUMENTS

| JP | 60136340 A | * | 7/1985 |
| JP | 2004-128493 A | | 4/2004 |
| JP | 2005-150752 A | | 6/2005 |
| JP | 2006-156043 A | | 6/2006 |

OTHER PUBLICATIONS

Yamada et al., Residual stress estimation of a silicon carbide-Kovar joint, Journal of Materials Science 26 No month 1991, pp. 2887-2892.*
Xiong et al., Brazing of SiC to wrought nickel-based superalloy using CoFeNi(Si,B)CrTi filler material, Materials Letters 61, Mar. 2007, pp. 4662-4665.*

* cited by examiner

*Primary Examiner*—Timothy M Speer
(74) *Attorney, Agent, or Firm*—Sughrue Mion, PLLC

(57) ABSTRACT

A strong silicide joint between silicon carbide and a metal is resistant to fracture even at high temperature. A method for manufacturing the silicide joint is also provided. This method includes the steps of: bringing a silicon carbide-based member into contact with a Kovar (Fe—Ni—Co alloy) member; and thermally joining the silicon carbide-based member to the Kovar member.

5 Claims, 5 Drawing Sheets

Fig.2
Fig. 2A
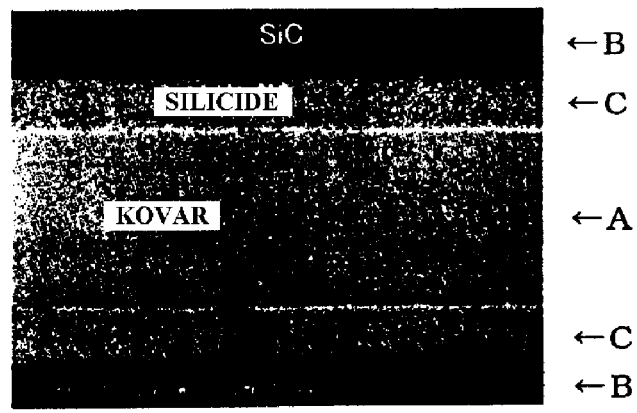
Fig. 2B
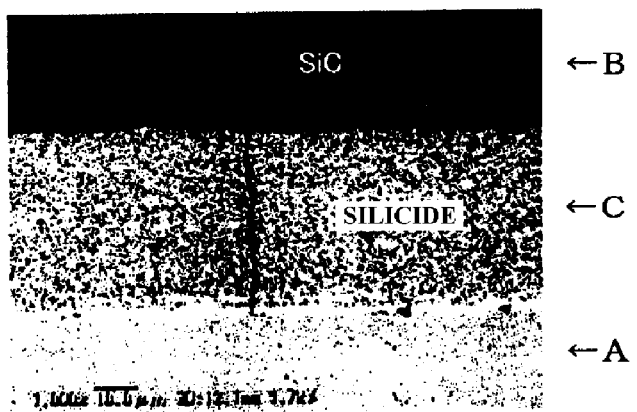
Fig. 2C
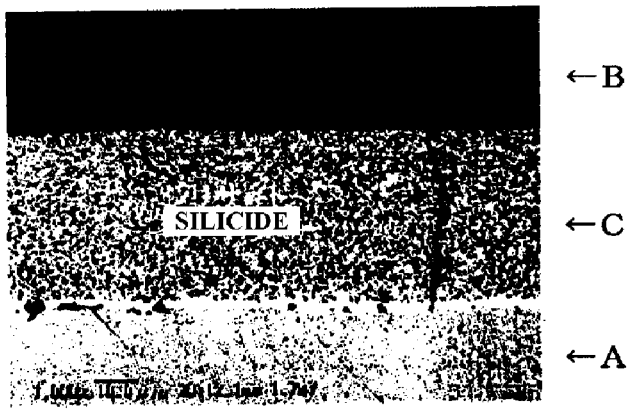

Fig. 3
Fig. 3A
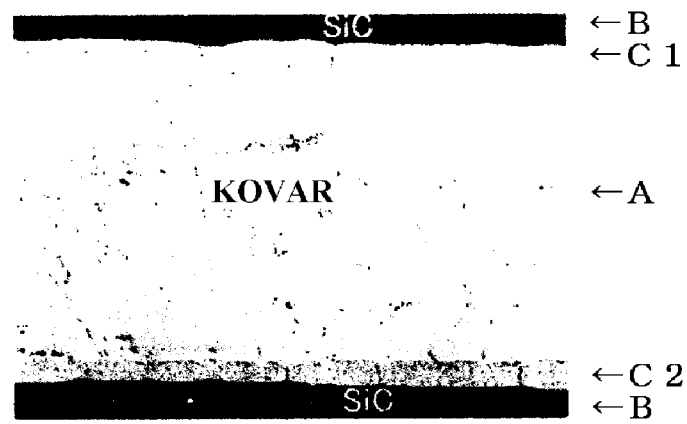
Fig. 3B
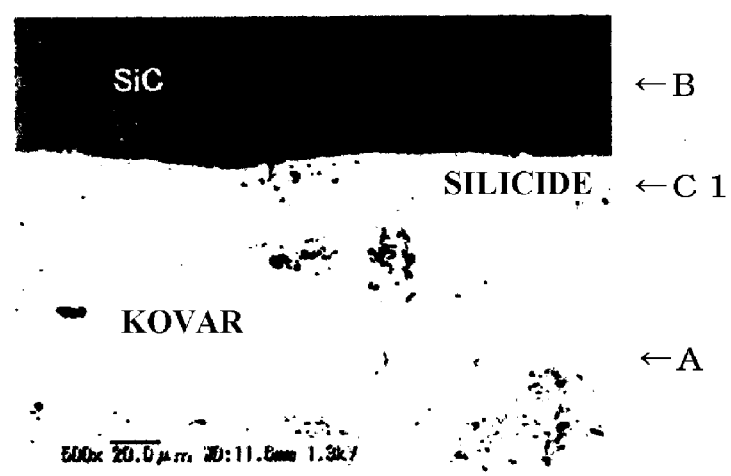
Fig. 3C
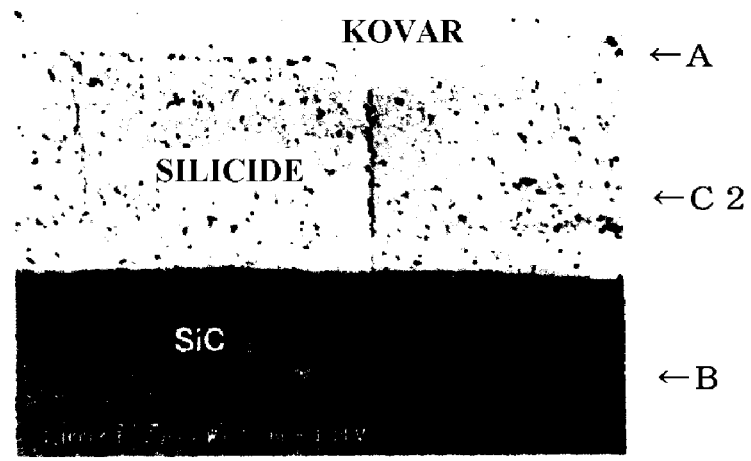

Fig. 5
Fig. 5A
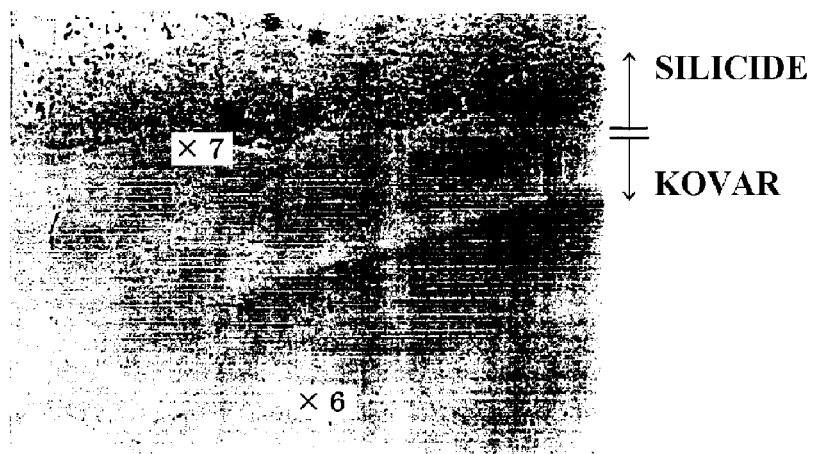
Fig. 5B
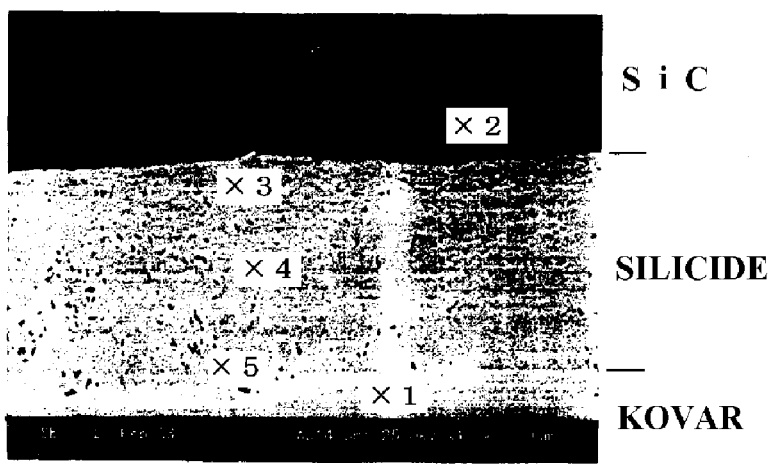
Fig. 5C
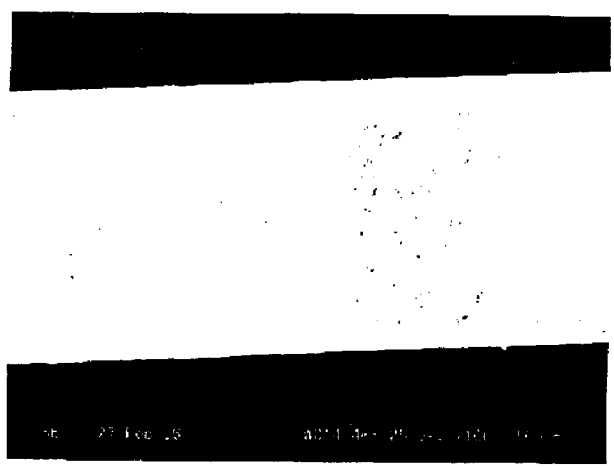

SILICIDE JOINT AND METHOD FOR MANUFACTURING THE SAME

BACKGROUND OF THE INVENTION

1. Field of the Invention

The present invention relates to a silicide joint and a method for manufacturing the silicide joint (hereinafter also referred to simply as "joint" and "method") and, more particularly, to a silicide joint that may suitably be used as a high-temperature-resistant electrode material for heaters and a method for manufacturing the silicide joint.

2. Description of the Related Art

Silicon carbide (SiC) and nickel (Ni) are generally known to join to each other ohmically (with negligible contact resistance) under particular conditions. Furthermore, silicon and nickel form a nickel silicide at high temperature (see, for example, Japanese Unexamined Patent Application Publications No. 2004-128493 and No. 2005-150752).

Silicon carbide is useful as a material for high-temperature-resistant products, such as resistant electrodes for heaters. For example, Japanese Unexamined Patent Application Publication No. 2006-156043 discloses a joint structure that includes an electrode connected to a sintered silicon carbide heater at one end, and a spiral feed-terminal screwed into the other end of the electrode, wherein the electrode is formed of sintered silicon carbide.

However, when silicon carbide is used as an electrode material for heaters, the difference in thermal expansion coefficient between silicon carbide and nickel or nickel silicide often causes a failure at the interface between silicon carbide and nickel or nickel silicide during a heating process. More specifically, as illustrated in FIG. 4, in a common electrode joint that includes a silicon carbide plate 12 fixed between metal plates 11, such as nickel plates, with a metal bolt 13 and a metal nut 14, as the temperature increases, the difference in thermal expansion coefficient between the metal bolt 13 and the metal nut 14, and the silicon carbide plate 12 may result in a gap between the metal plates 11 and the silicon carbide plate 12 or in an outwardly warped metal plate 11. This may result in a longitudinal or transverse crack, finally causing a fracture. Hence, silicon carbide is difficult to use as an electrode material.

SUMMARY OF THE INVENTION

Accordingly, it is an object of the present invention to solve the problems described above and provide a strong silicon carbide-metal joint that is resistant to fracture even at high temperature.

As a result of extensive research to solve the above-mentioned problems, the present inventors perfected the present invention by discovering that among metals (alloys) Kovar (trade name), which is mainly composed of 29% of Ni, 17% of Co, and 53.5% of Fe, has a thermal expansion coefficient close to that of silicon carbide and that a joint resistant to fracture can be formed by using Kovar in place of nickel.

According to one aspect of the present invention, a method for manufacturing a silicide joint includes the steps of bringing a silicon carbide-based member into contact with a Kovar member and thermally joining the silicon carbide-based member to the Kovar member.

According to another aspect of the present invention, a silicide joint is manufactured by the method described above.

Thus, the present invention provides a strong silicide joint that is formed between silicon carbide and a metal and that is resistant to fracture even at high temperature and a method for manufacturing the silicide joint. The present invention is therefore useful in applications that require strong bonding between silicon carbide and a metal at high temperature, such as electrode materials for heaters.

BRIEF DESCRIPTION OF THE DRAWINGS

FIGS. 2A to 2C are enlarged sectional views of a silicide joint according to Example 1;

FIGS. 3A to 3C are enlarged sectional views of a silicide joint according to Example 2;

FIGS. 5A to 5C are enlarged views of a SiC-Kovar joint formed by heating a silicon carbide member and a Kovar member.

DESCRIPTION OF THE PREFERRED EMBODIMENTS

Preferred embodiments of the present invention will be described in detail below.

A silicide joint according to the present invention is manufactured by bringing a silicon carbide-based member into contact with a Kovar member and thermally joining the silicon carbide-based member to the Kovar member.

Figure 1:
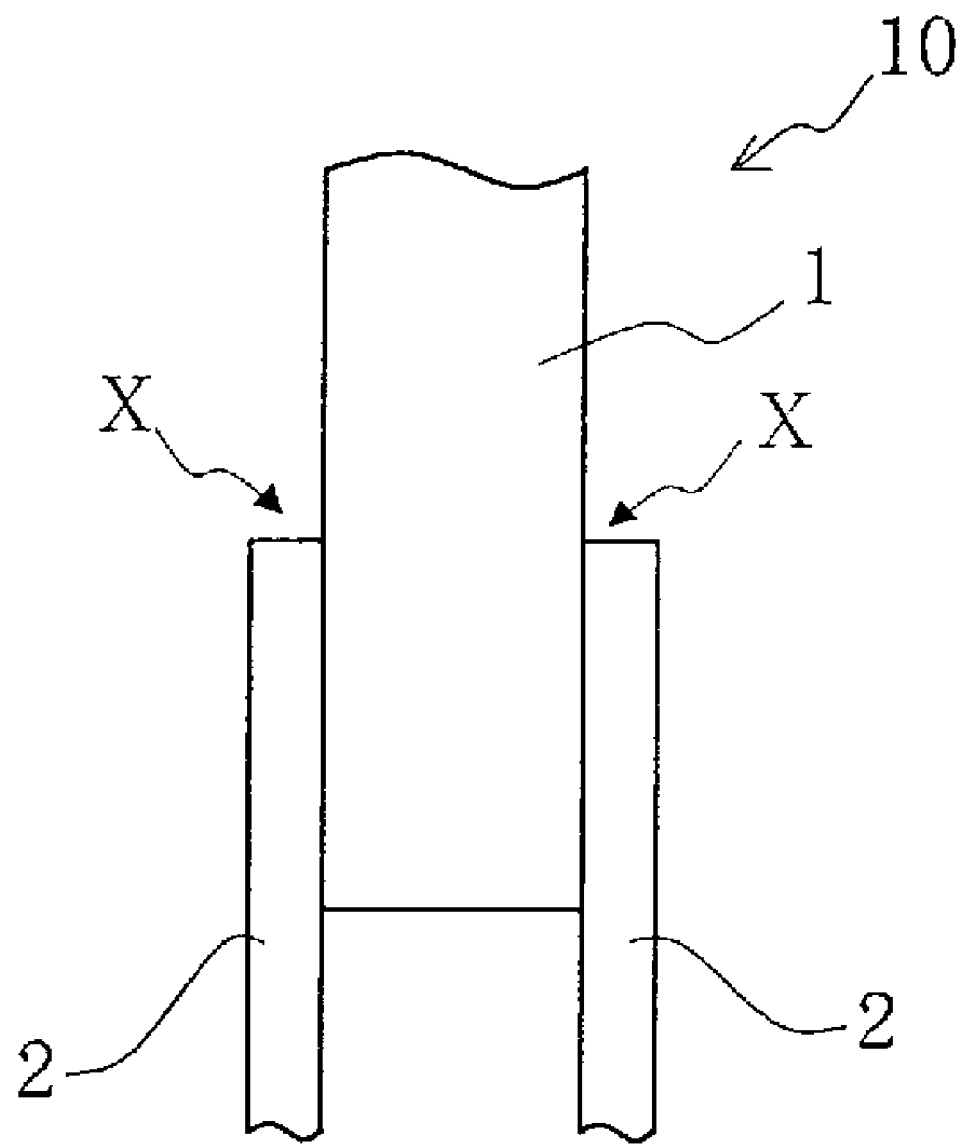
FIG. 1 is a schematic explanatory view of a silicide joint according to an embodiment of the present invention.
Figure 4:
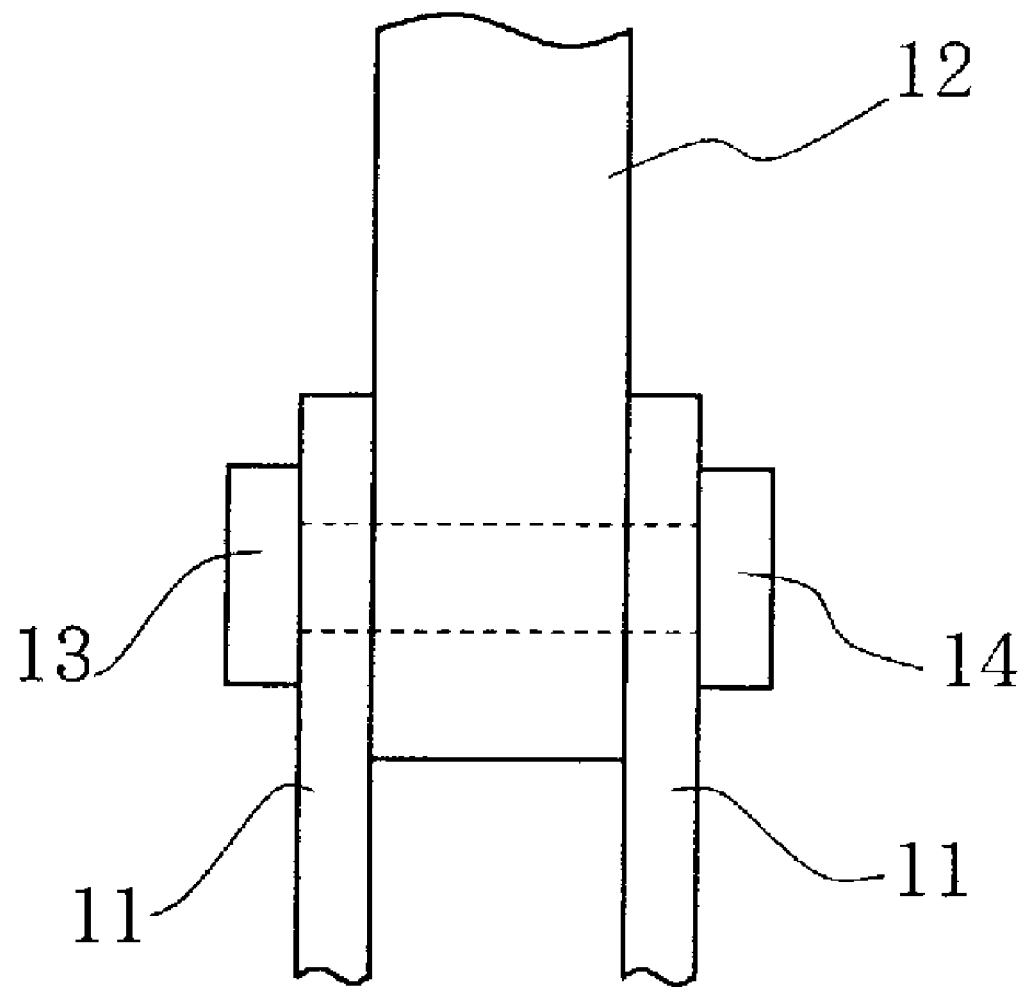
FIG. 4 is a schematic explanatory view of an existing electrode for heaters.

As described above, Kovar (trade name) is a Fe—Ni—Co alloy mainly composed of 29% of Ni, 1% of Co, and 53.5% of Fe. Kovar has high rigidity and a thermal expansion coefficient smaller than that of nickel. The thermal expansion coefficients of silicon carbide, Kovar, nickel silicide, and nickel increase in this order. Although cracks may appear between silicon carbide and Kovar, joining conditions can be optimized to form a clear joint interface having less cracks. Thus, as illustrated in FIG. 1, according to the present invention, a silicon carbide member 1 and a Kovar member 2 are joined to each other by the formation of silicide. A silicide joint 10 can therefore be formed without conventional screws. The silicide joint 10 can reduce defects caused by the loosening of screws and has improved durability. As a matter of course, screws may be used to further secure the joint. Kovar is commercially available from Westinghouse Electric Corp., USA. Kovar is also referred to as Fernico.

The term "silicon carbide-based member", as used herein, refers to a member that is prepared by sintering a raw powder mainly composed of silicon carbide and processing and polishing the resulting sintered body, or a member that is prepared by dissolving the raw powder in a solvent to form slurry, charging the slurry into a mold having a desired shape, and calcining the slurry to impregnate it with metallic silicon. A method for manufacturing the silicon carbide-based member will be further described below. This method essentially follows routine procedures.

A method for manufacturing sintered silicon carbide will be described below.

(Sintered Silicon Carbide)

Examples of a silicon carbide powder used as a raw material for sintered silicon carbide include powders of α-silicon carbide, β-silicon carbide, and amorphous silicon carbide, and mixtures thereof. In particular, a β-silicon carbide powder is preferred in terms of the thermal expansion coefficient of the sintered compact. The β-silicon carbide powder may be of any type, including commercially available β-silicon carbide powders. The particle size of the silicon carbide powder is preferably small in terms of a greater packaging density, and is generally in the range of 0.01 to 10 μm and preferably in the range of 0.05 to 5 μm. The silicon carbide powder having a particle size less than 0.01 μm is difficult to weigh or mix. The silicon carbide powder having a particle size more than 5 μm has a small specific surface area, which results in a small contact area between adjacent powders, being difficult to achieve a greater packaging density.

More preferably, the silicon carbide powder has a particle size in the range of 0.05 to 1 μm and a specific surface area of at least 5 m$^2$/g, and contains 1% or less of free carbon and 1% or less of oxygen. The silicon carbide powder may have any particle size distribution. The particle size distribution may have at least two peaks to increase the packing density and to improve the reactivity of silicon carbide in the manufacture of sintered silicon carbide.

When a joint according to the present invention requires high-purity sintered silicon carbide, the high-purity sintered silicon carbide is suitably prepared from a high-purity silicon carbide powder.

The high-purity silicon carbide powder may be manufactured by a method including firing a uniform mixture of a silicon source containing at least one silicon compound, a carbon source containing at least one organic compound that produces carbon by heating, and a polymerization or crosslinking catalyst in a nonoxidizing atmosphere.

In the manufacture of the sintered silicon carbide, a silicon carbide powder may uniformly be mixed with a nonmetallic sintering aid. More specifically, a nonmetallic sintering aid, such as a phenolic resin, dissolved in a solvent, such as ethyl alcohol, may sufficiently be mixed with a silicon carbide powder. The mixing may be performed by known mixing means, such as a mixer or a planetary ball mill, for 10 to 30 hours, preferably for 16 to 24 hours. After sufficient mixing, the mixture may be evaporated to dryness by removing the solvent at an appropriate temperature, for example, in the range of 50° C. to 60° C. for ethyl alcohol, and may be sifted through a sieve to produce a raw powder. To achieve high purity, mixing means, such as a ball mill container and balls, should be made of a synthetic resin which hardly contains metal. A granulator, such as a spray drier, may be used to dry the mixture.

The raw powder may be sintered in a mold at a temperature in the range of 2000° C. to 2400° C. and a pressure in the range of 29 to 69 MPa in a nonoxidizing atmosphere. Before sintering, the raw powder may be formed into a compact.

To prepare a high-purity sintered compact, a mold may be formed partly or entirely of graphite to prevent the compact from coming into contact with metal of the mold, or may be lined with a polytetrafluoroethylene (Teflon (registered trademark)) sheet.

While the sintering pressure is in the range of 29 to 69 MPa, when the sintering pressure exceeds 39 MPa, press components, such as a die and a punch, must be highly resistant to pressure.

A method for manufacturing a silicon carbide compact will be described below.

(Silicon Carbide Compact)

In the manufacture of a silicon carbide compact, first, a silicon carbide powder, a carbon source, and optionally an organic binder, an anti-foaming agent, and/or other additives may be dissolved or dispersed in a solvent to form mixed powder slurry. Thorough agitation of mixed powder slurry during the dissolution or dispersion process allows pores to be uniformly dispersed in a green compact.

The silicon carbide powder, the carbon source, and other raw materials may be the same as in the manufacture of the sintered silicon carbide described above.

The resulting silicon carbide compact may be processed by various methods. Examples of cutting a member from the compact include linear cutting with a wire-electric discharge machine or a diamond cutter and curvilinear cutting with a wire-electric discharge machine. Examples of drilling include drilling of a circular hole with a die-sinking electric discharge machine or a diamond-grinding machine, drilling of a blind hole or a stepped hole with a grinding machine or a die-sinking electric discharge machine, drilling of a deformed hole with a wire-electric discharge machine or a die-sinking electric discharge machine, tapping with a die-sinking electric discharge machine or a diamond tapping machine, external threading with a cylindrical grinding machine or a lathe equipped with a diamond-electrodeposited tip, surface processing with a diamond surface grinder or a lapping machine, and grooving with a die-sinking electric discharge machine or a shape grinding machine.

An electric discharge machine, such as a die-sinking electric discharge machine or a wire-electric discharge machine may be a common metalworking electric discharge machine. A higher-power electric discharge machine allows easier processing and can reduce the processing time. As a guideline, a power supply circuit may include a built-in stabilizing circuit, the maximum instantaneous working current may be at least 50 amperes, the maximum wire feed rate may be at least 15 m/min, and the wire may be a Compeed (trade name) wire having a diameter of about 0.3 mm. An electric discharge machine may be of working fluid immersion type rather than spray type.

The silicon carbide compact may be processed into a member having a desired shape by known machining procedures, including cutting, drilling, and threading of components, manufacture of fastening devices, such as bolts and nuts, and mirror-like finishing.

According to the present invention, a silicon carbide-based member thus manufactured is heat-treated while the silicon carbide-based member is in contact with a Kovar member. The heat treatment may be performed preferably at a temperature in the range of 600° C. to 1400° C. for 1 to 10 hours, more preferably at a temperature in the range of 700° C. to 1000° C. for 1 to 6 hours. An excessively long reaction time often results in growth of a silicide layer, causing a crack. On the other hand, an excessively short reaction time may result in insufficient growth of a joint layer. An excessively high reaction temperature may cause a crack during cooling, because of thermal expansion before and after the reaction, thus causing a stability problem. On the other hand, an excessively low reaction temperature may result in no silicide formation. Since Kovar is a Fe—Ni—Co alloy, Kovar reacts with silicon carbide to yield nickel silicide and iron silicide in the heat treatment. Nickel silicide is formed at a temperature of at least 700° C. However, since Kovar contains iron and cobalt, as well as nickel, the heat treatment must be performed at a temperature in the range of 600° C. to 1400° C.

A silicide joint according to the present invention thus manufactured has a strong joint interface at normal temperature without using mechanical fastening means, such as screws. In addition, the silicide joint produces no crack at a high temperature of at least 1400° C., thus having high durability. A silicide joint according to the present invention is therefore suitably used as a high-temperature-resistant electrode material for heaters, and finds widespread application.

EXAMPLES

The present invention will be described in more detail with reference to the following examples.

(Manufacture of Silicide Joint)

Example 1

A Kovar sheet (Ni: 29%, Co: 17%, Fe: 53.5%, Mn: 0.3%, and Se: 0.2%) having a thickness of 0.20 mm and two silicon carbide plates disposed on both sides of the Kovar sheet and each having a thickness of 2 mm (SiC/Kovar/SiC) were heat-treated at a temperature of 800° C. for 5 hours to join to each other. Photographs shown in FIGS. 2A to 2C and Table 1 show the results.

As shown in FIGS. 2A to 2C, a crack appeared vertically only in a silicide layer C. No crack passed through a Kovar layer A and a silicon carbide layer B. This is probably because the thickness of the residual Kovar layer A is more than twice the thickness of the silicide layer C.

TABLE 1

| | Example 1 |
|---|---|
| Total thickness of upper silicide layer, Kovar layer, and lower silicide layer | 216.7 μm (Amount of growth: 16.7 μm) |
| Thickness of Kovar layer | 137.3 μm |
| Crack | Observed Vertically only in silicide layer |

Comparative Example 1

A molybdenum (Mo) sheet having a thickness of 0.50 mm and two silicon carbide plates disposed on both sides of the molybdenum sheet and each having a thickness of 2 mm (SiC/Mo/SiC) were heat-treated at a temperature of 800° C. for 5 hours. However, the molybdenum sheet was not joined to the silicon carbide plates. While silicon carbide reacts with molybdenum at a temperature of at least 1000° C., the molybdenum sheet did not react with the silicon carbide plate when the molybdenum sheet was pressed against the silicon carbide plate at 1000° C.

Example 2

A Kovar sheet (Ni: 29%, Co: 17%, Fe: 53.5%, Mn: 0.3%, and Se: 0.2%) having a thickness of 0.20 mm, nickel foil, and two silicon carbide plates sandwiching the Kovar sheet and the nickel foil and each having a thickness of 2 mm (SiC/Ni/Kovar/SiC) were heat-treated at a temperature of 800° C. for 5 hours to join to each other.

Nickel silicide was formed between the nickel foil and the silicon carbide plate. The nickel foil was fused to the Kovar sheet. Because Kovar contains 29% of Ni, Kovar is expected to form a graded layer with nickel. Furthermore, because Kovar has a thermal expansion coefficient similar to that of silicon carbide, it is assumed that a Ni-Kovar/SiC joint shows less cracks than a Ni/SiC joint and therefore has a high bonding strength. Photographs shown in FIGS. 3A to 3C show the results.

A silicide layer C2 formed between the silicon carbide plate and the Kovar sheet via the nickel foil showed many cracks (FIG. 3C), and partly had a detached portion. By contrast, the Kovar sheet was closely joined to the silicon carbide plate that was in contact with the Kovar sheet (silicide layer C1). Cracks in the silicide layer C1 did not extend to the silicon carbide layer B (FIG. 3B). Furthermore, the boundary between a Kovar layer A and the nickel silicide layer C1 was clear, as shown by a white line in the photograph (FIG. 3B). This is probably because nickel in the Kovar sheet was used to form the nickel silicide layer C1, and the Kovar layer A contained a reduced amount of nickel.

(Composition Analysis of Silicide Joint)

Table 2 shows the composition analysis of a silicon carbide-Kovar joint formed by heat-treating a silicon carbide member and a Kovar member (see photographs shown in FIGS. 5A to 5C).

TABLE 2

| Photograph | | Composition (%) | | | | |
|---|---|---|---|---|---|---|
| No. | Location | Fe | Ni | Co | Si | C |
| 1 | Kovar layer | 35.4 | 17.7 | 10.5 | 1.1 | 35.2 |
| 2 | SiC layer | — | — | — | 30.7 | 69.3 |
| 3 | Silicide layer near SiC layer | 4.4 | 14.5 | 3.1 | 11.3 | 66.8 |
| 4 | Middle of silicide layer | 11.3 | 3.8 | 3.3 | 5.2 | 76.4 |
| 5 | Silicide layer near Kovar layer | 14.4 | 4.4 | 4.2 | 6.6 | 70.5 |
| 6 | Kovar layer | 42 | 21.5 | 12.5 | 1.6 | 22.4 |
| 7 | Boundary between silicide layer and Kovar layer | 18.2 | 8.8 | 4.8 | 7.7 | 60.5 |

As described above, silicides formed between silicon carbide and Kovar are nickel silicide and iron silicide. Metal silicides were nonuniformly distributed in the silicide layer. Table 2 shows that, in the silicide layer, nickel silicide was formed predominantly in the neighborhood of the silicon carbide layer, and iron carbide was formed predominantly between the middle of the silicide layer and the neighborhood of the Kovar layer. This is probably because nickel silicide can diffuse more rapidly than iron carbide, or nickel silicide can be formed more easily than iron carbide. Cobalt was distributed uniformly in the silicide layer. Cobalt may be distributed not only as cobalt silicide, but also as elementary cobalt.

What is claimed is:

1. A method for manufacturing a silicide joint, the silicide joint forming an electrode material for a heating, the method comprising:
    bringing a silicon carbide-based member into contact with a Fe—Ni—Co alloy member; and then
    thermally joining the silicon carbide-based member to the Fe—Ni—Co alloy member at a temperature of 700 to 1000° C.,
    wherein a thickness of the Fe—Ni—Co alloy member, after the thermal joining, is more than twice a thickness of a silicide layer that is formed between the silicon carbide-based member and the Fe—Ni—Co alloy member during thermal joining.

2. A silicide joint manufactured by the method according to claim 1.

3. The method for manufacturing a silicide joint according to claim 1, further comprising formation of a nickel silicide and an iron silicide.

4. The method for manufacturing a silicide joint according to claim 1, wherein the silicon carbide-based member is thermally joined to the Fe—Ni—Co alloy member at a temperature of 700 to 800° C.

5. The method for manufacturing a silicide joint according to claim 1, wherein the silicon carbide-based member is brought into direct contact with the Fe—Ni—Co alloy member for the thermal joining.

* * * * *